US012614495B2

(12) United States Patent
Zhong et al.

(10) Patent No.: US 12,614,495 B2
(45) Date of Patent: Apr. 28, 2026

(54) METHOD AND SYSTEM FOR GENERATING COMPENSATION DATA, DISPLAY PANEL AND COMPENSATION METHOD THEREOF

(71) Applicant: TCL CHINA STAR OPTOELECTRONICS TECHNOLOGY CO., LTD., Shenzhen (CN)

(72) Inventors: Xiaojie Zhong, Shenzhen (CN); Yufeng Jin, Shenzhen (CN); Xinyi Kang, Shenzhen (CN); Lingmin Guo, Shenzhen (CN); Rong Su, Shenzhen (CN); Shunqiang You, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/631,161

(22) Filed: Apr. 10, 2024

(65) Prior Publication Data

US 2025/0218329 A1 Jul. 3, 2025

(30) Foreign Application Priority Data

Dec. 27, 2023 (CN) ......................... 202311830208.1

(51) Int. Cl.
*G09G 3/20* (2006.01)

(52) U.S. Cl.
CPC ... *G09G 3/2074* (2013.01); *G09G 2320/0233* (2013.01); *G09G 2320/0242* (2013.01); *G09G 2360/16* (2013.01)

(58) Field of Classification Search
CPC ......... G09G 3/2074; G09G 2320/0233; G09G 2320/0242; G09G 2320/0693; G09G 2360/16
See application file for complete search history.

(56) References Cited

U.S. PATENT DOCUMENTS 8,885,000 B2 * 11/2014 Sasaki .................. G09G 3/2092 345/694
9,189,986 B2 * 11/2015 Sasaki ...................... G09G 3/20
(Continued)

FOREIGN PATENT DOCUMENTS

CN 106384576 A 2/2017
CN 113284458 A 8/2021
(Continued)

OTHER PUBLICATIONS

Chinese Office Action issued in corresponding Chinese Patent Application No. 202311830208.1 dated Sep. 24, 2025, pp. 1-8.

*Primary Examiner* — Gene W Lee
(74) *Attorney, Agent, or Firm* — PV IP PC; Peter Stecher; Wei Te Chung

(57) ABSTRACT

A method for generating compensation data, which is applied to a display panel including a first area having a smaller size and a second area having a larger size. The method includes acquiring standard optical data of the display panel corresponding to one or more standard pictures, and first actual optical data of the first area corresponding to the one or more standard pictures; generating corresponding first compensation data according to a first compensation rule, the standard optical data, and the first actual optical data; acquiring second actual optical data of the second area in the display panel compensated by the first compensation data corresponding to the one or more standard pictures; generating corresponding second compensation data according to a second compensation rule, the standard optical data, and the second actual optical data, a compensation accuracy of the second compensation rule being less than that of the first compensation rule.

11 Claims, 8 Drawing Sheets

(56) References Cited

U.S. PATENT DOCUMENTS

| | | | | |
|---|---|---|---|---|
| 9,743,073 | B2 * | 8/2017 | Huang | G09G 3/2003 |
| 10,504,400 | B2 * | 12/2019 | Wang | G06T 5/73 |
| 12,374,267 | B2 * | 7/2025 | Heo | G09G 3/006 |
| 2019/0228737 | A1 * | 7/2019 | Lin | H04N 9/64 |

FOREIGN PATENT DOCUMENTS

| | | | |
|---|---|---|---|
| CN | 115862563 | A | 3/2023 |
| CN | 116129795 | A | 5/2023 |

* cited by examiner

METHOD AND SYSTEM FOR GENERATING COMPENSATION DATA, DISPLAY PANEL AND COMPENSATION METHOD THEREOF

CROSS-REFERENCE TO RELATED APPLICATION

This application claims priority to and the benefit of Chinese Patent Application No. 202311830208.1, filed on Dec. 27, 2023, the disclosure of which is incorporated herein by reference in its entirety.

TECHNICAL FIELD

The present disclosure relates to the field of display technologies, and more particularly, to the manufacture of display devices, and specifically, to a method and system for generating compensation data, a display panel, and a compensation method thereof.

BACKGROUND

With the continuous development and popularization of displays, various industries have increasingly high requirements for display colors. Color accuracy may be used as a basis for judging the degree of accuracy for colors, in order to quantify whether a display correctly presents colors.

However, for displayed pictures with high color requirements, it is often required to operate across multiple displays. Even for a same display, it will be affected by differences such as in panel technology, resulting in an inconsistency between colors in the final presentation and the color accuracy, leading to color distortion.

Therefore, existing LCD products suffer from the above problems and urgently need to be improved.

SUMMARY

It is an object of the present disclosure to provide a method and system for generating compensation data, a display panel, and a compensation method thereof.

The present disclosure provides a method for generating compensation data, which is applied to a display panel, the display panel including a display area, the display area including a first area and a second area, a size of the first area being smaller than a size of the second area, the method for generating compensation data including: acquiring standard optical data of the display panel corresponding to one or more standard pictures, and first actual optical data of the first area corresponding to the one or more standard pictures; generating corresponding first compensation data according to a first compensation rule, the standard optical data, and the first actual optical data; compensating the display panel according to the first compensation data, and acquiring second actual optical data of the second area in the compensated display panel corresponding to the one or more standard pictures; generating corresponding second compensation data according to a second compensation rule, the standard optical data, and the second actual optical data, a compensation accuracy of the second compensation rule being less than a compensation accuracy of the first compensation rule.

The present disclosure also provides a compensation method for a display panel which is applied to the display panel, the display panel including a display area, the display area including a first area and a second area, a size of the first area being smaller than a size of the second area, the compensation method including: acquiring initial display data of one or more pictures to be displayed, the initial display data including first initial display data corresponding to the first area and second initial display data corresponding to the second area; acquiring second compensation data corresponding to the second area, and compensating the second initial display data according to the second compensation data to generate intermediate display data corresponding to the second area; acquiring first compensation data corresponding to the display area, compensating the first initial display data and the intermediate display data according to the first compensation data, respectively, to generate first display data and second display data, respectively, a compensation accuracy of the second compensation data being less than a compensation accuracy of the first compensation data.

The present disclosure also provides a display panel including: a panel body; a memory for storing the first compensation data and the second compensation data as described above; a controller for invoking the first compensation data and the second compensation data to perform the compensation method for the display panel as described above.

The present disclosure further provides a system for generating compensation data, which is applied to a display panel, the display panel including a display area, the display area including a first area and a second area, a size of the first area being smaller than a size of the second area, the system for generating compensation data including: an optical instrument configured to acquire first actual optical data of the first area corresponding to one or more standard pictures; a computer configured to acquire standard optical data of the display panel corresponding to the one or more standard pictures; wherein the computer is further configured to generate corresponding first compensation data according to a first compensation rule, the standard optical data, and the first actual optical data; wherein the computer is further configured to compensate the display panel according to the first compensation data; wherein the optical instrument is further configured to acquire second actual optical data of the second area in the compensated display panel corresponding to the one or more standard pictures; wherein the computer is further configured to generate corresponding second compensation data according to a second compensation rule, the standard optical data, and the second actual optical data, wherein a compensation accuracy of the second compensation rule is less than a compensation accuracy of the first compensation rule; wherein the computer is further configured to generate a compensation file applied to the display panel according to the first compensation data and the second compensation data.

BRIEF DESCRIPTION OF THE DRAWINGS

The present disclosure is further illustrated by the accompanying drawings. It is to be noted that the drawings in the following description are merely illustrative of some embodiments of the present disclosure, and that other drawings may be made by those skilled in the art without involving any inventive effort.

DETAILED DESCRIPTION

The following will provide a clear and complete description of the technical solutions in the embodiments of the present invention, in conjunction with the accompanying drawings. It will be apparent that the described embodiments are only part of the embodiments of the present disclosure and not all of them. Based on the embodiments of the present disclosure, all other embodiments obtained by a person skilled in the art without involving inventive efforts fall within the scope of the present disclosure.

In the description of the present disclosure, the terms "first", "second" and the like are used for descriptive purposes only and are not to be construed as indicating or implying relative importance or implying the number of indicated technical features. Thus, features defined by "first", "second" and the like may explicitly or implicitly include one or more of the described features. In addition, it should be noted that the accompanying drawings only provide structures that are relatively closely related to the present disclosure, and some details that are not closely related to the present disclosure are omitted. The purpose is to simplify the drawings and make the inventive concepts clear at a glance, without indicating that the accompanying drawings is exactly the same as the device(s) in actuality or that they are set to be the limitation(s) of the device(s) in actuality.

Reference herein to "an embodiment" means that a particular feature, structure, or characteristic described in connection with the embodiment may be included in at least one embodiment of the present disclosure. The appearances of this phrase in various places in the specification do not necessarily refer to a same embodiment, nor do they necessarily refer to separate or alternative embodiments mutually exclusive of other embodiments. It will be explicitly and implicitly understood by those skilled in the art that the embodiments described herein may be combined with other embodiments.

The present disclosure provides a method of generating compensation data to be applied to a display panel, which may include, but is not limited to, the following embodiments and combinations of the following embodiments.

Figure 1:
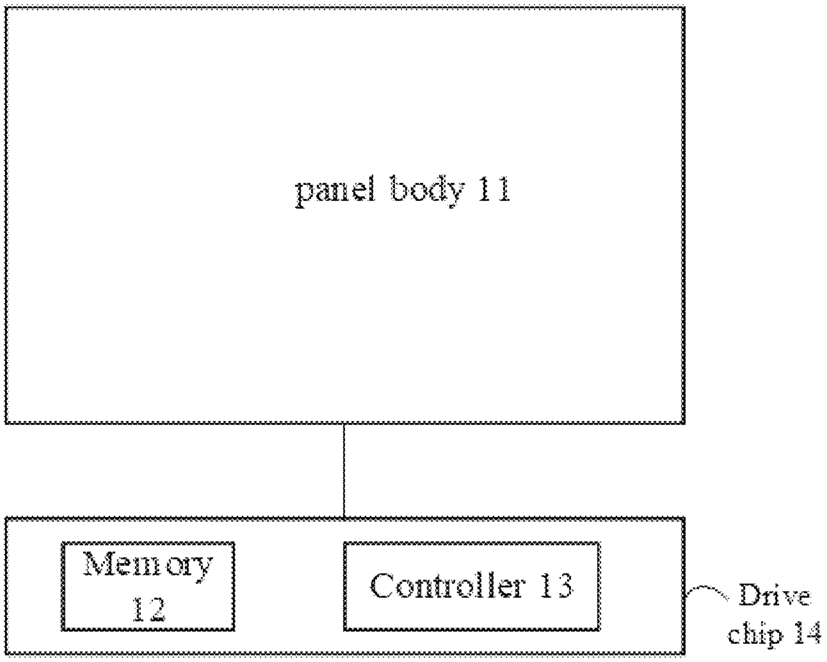
FIG. 1 and FIGS. 3-7 are six respective flow charts of a method for generating compensation data according to embodiments of the present disclosure.

In some embodiments, as shown in FIG. 1, the method for generating compensation data may include, but is not limited to, the following steps S1 to S4 and combinations of the following steps S1 to S4.

At step S1, standard optical data of a display panel corresponding to one or more standard pictures, and first actual optical data of a first area corresponding to the one or more standard pictures is acquired.

Figure 2:
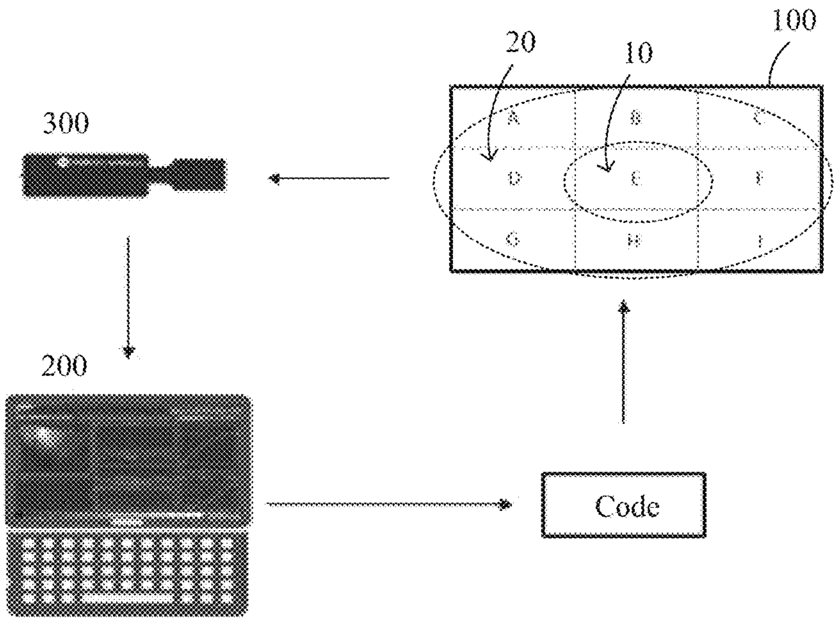
FIG. 2 is a schematic diagram of a scenario in which a system for generating compensation data is applied according to embodiments of the present disclosure.

The display panel in the present embodiment may be a liquid crystal display panel or a self-luminous display panel. As shown in FIG. 2, the display panel 100 includes a display area including a first area 10 and a second area 20. The size of the first area 10 is smaller than the size of the second area 20. The display area may be construed as an area for displaying one or more pictures in the display panel in which a plurality of pixels may be provided, each of which emits light under control of a corresponding data voltage so that the display area presents the displayed picture(s). The specific positions of the first area 10 and the second area 20 are not limited herein, and either of the two may be disposed near or away from the center of the display area. Here, it is sufficient to satisfy that the size of the first area 10 is smaller than the size of the second area 20, and there is no limitation on the relationship between the number of pixels in the two areas. If a plurality of pixels may be uniformly distributed in the display area, then the number of the pixels in the first area 10 may be considered to be smaller than the number of the pixels in the second area 20. Of course, for other distributions of pixels, it is also possible to allow the number of pixels in the first area 10 to be greater than or equal to the number of pixels in the second area 20.

Specifically, the above-described pixels may be understood as pixel cells or sub-pixels, and the pixel cell may include a plurality of sub-pixels of different colors. In the present disclosure, reference is made only to examples in which each of the pixel cells includes a red sub-pixel, a green sub-pixel, and a blue sub-pixel for explanation. Ranges of the grayscale values of the sub-pixels of each color may be the same. The sub-pixels of each color may have corresponding data voltages at each grayscale value. The data voltages of the sub-pixels of different colors at a same grayscale value may be the same or different in consideration of the differences in characteristics of the sub-pixels of different colors. The display panel may drive each sub-pixel to emit light using the corresponding data voltage based on the grayscale value of the sub-pixel. For example, the grayscale value of each sub-pixel may be taken from any one between 0 and 255, which corresponds to 256 data voltages. The display panel may store a mapping relationship between the grayscale values and the data voltages of the sub-pixels of respective colors.

The standard picture may be construed as a pure-color picture, that is, grayscale values of the sub-pixels of a same color in different pixel cells are the same. For example, the grayscale values of red sub-pixels in each pixel cell may all be R, the grayscale values of green sub-pixels in each pixel cell may all be G, and the grayscale values of blue sub-pixels in each pixel cell may all be B. Thus, the standard picture may have a set of corresponding R, G, and B.

The number of the standard pictures is greater than one. Each of the standard pictures has corresponding standard optical data. In combination with the above discussion, each standard picture has a set of corresponding R, G and B, with a plurality of red sub-pixels emitting light under the control of the data voltage corresponding to R, a plurality of green sub-pixels emitting light under the control of the data voltage corresponding to G, and a plurality of blue sub-pixels emitting light under the control of the data voltage corresponding to B so as to present the standard picture. The standard optical data may be construed as the optical information that the display area should theoretically possess at the moment.

Specifically, the optical data in the present disclosure may include a total luminance value of a corresponding area, and total luminance values of sub-pixels of respective colors. For example, as shown in FIG. 2, the display area may be divided into nine areas A, B, C, D, E, F, G, H, I having sizes close or even equal to each other. Here, the standard optical data may include a total luminance value of the nine areas, a luminance value of each of the nine areas, a luminance value X of all red sub-pixels in the entirety of the nine areas, a luminance value Y of all green sub-pixels in the entirety of the nine areas, a luminance value Z of all blue sub-pixels in the entirety of the nine areas, and a luminance value X of all red sub-pixels in each of the nine areas, a luminance value Y of all green sub-pixels in each of the nine areas, a luminance value Z of all blue sub-pixels in each of the nine areas. Here, the term "luminance value" indicates a theoretical luminance value of an object given the standard picture(s).

Figure 3:
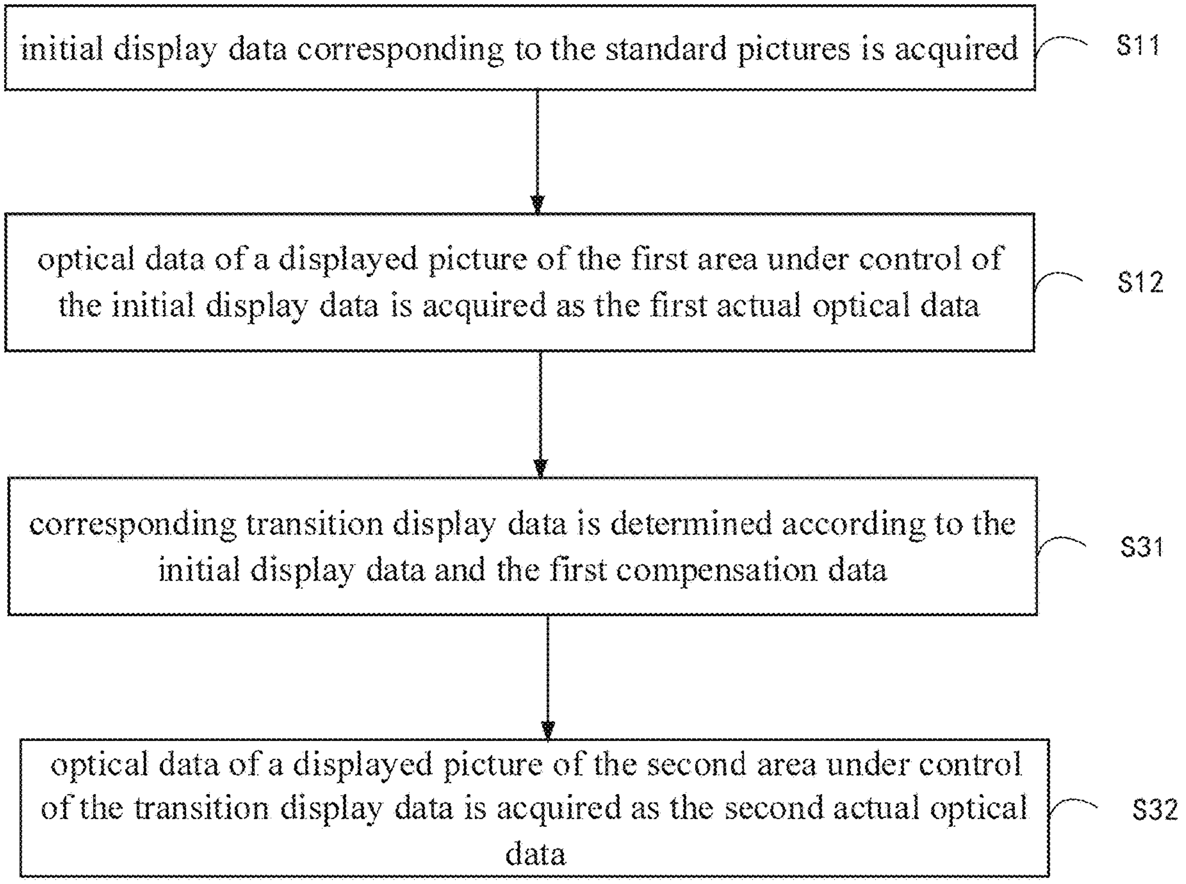

Specifically, as shown in FIG. 3, the step S1 of acquiring the first actual optical data of the display panel corresponding to the one or more standard pictures may include, but is not limited to, the following steps S11 and S12 and combinations of the following steps S11 and S12.

At step S11, initial display data corresponding to the standard pictures is acquired.

The initial display data may include grayscale values of each sub-pixel in each pixel cell in the display area, or in other words, the grayscale values of each sub-pixel in each pixel cell may be determined from the initial display data. As discussed above, sub-pixels of a same color in different pixel cells have the same grayscale values given the standard picture(s), that is, the initial display data may be used to determine at least the grayscale value R of all red sub-pixels, the grayscale value G of all green sub-pixels, and the grayscale value B of all blue sub-pixels given the standard picture(s).

At step S12, optical data of a displayed picture of the first area under control of the initial display data is acquired as the first actual optical data.

Similarly, based on the existence of a plurality of standard pictures, the first area 10 has corresponding first actual optical data for each of the standard pictures, that is, the first area 10 has corresponding first actual optical data given each of the standard pictures.

As can be seen from the above discussion, a set of corresponding R, G, and B may be determined from the initial display data corresponding to each of the standard pictures, and then three data voltages corresponding to the standard picture may in turn be determined. Further, a plurality of pixel cells in the display area may be driven to emit light by the three data voltages, and optical data of the first area 10 measured at the moment may be used as the first actual optical data. As discussed above, the first actual optical data may include a total luminance value of the first area 10, a luminance value X of all red sub-pixels in the first area 10, a luminance value Y of all green sub-pixels in the first area 10, and a luminance value Z of all blue sub-pixels in the first area 10. Here, the term "luminance value" indicates an actual luminance value of the object given the standard picture(s).

Subsequent to step S1, as shown in FIG. 1, the method further includes step S2.

At step S2, corresponding first compensation data is generated according to a first compensation rule, the standard optical data, and the first actual optical data.

As can be seen from the above discussion, the standard optical data may include luminance values of sub-pixels of each color in each of the divided areas in the display area. For example, the first area 10 may be any one or more of the nine areas in FIG. 2, that is, the standard optical data of the first area 10 (referred to as the first standard optical data) may be determined from the standard optical data. Further, based on the theoretical optical data (i.e., the first standard optical data) and the actual optical data (i.e., the first actual optical data) of the first area 10, the first compensation data corresponding to the first area 10 may be generated.

Figure 4:
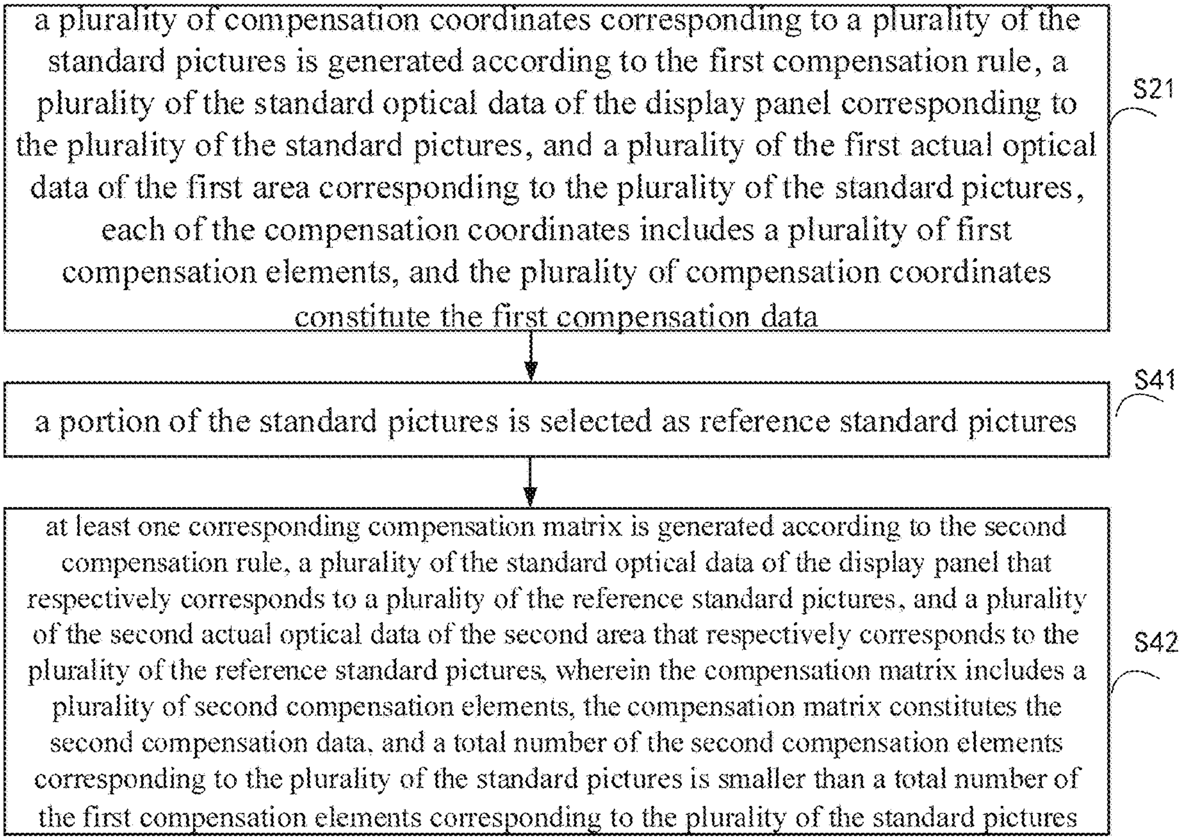

Specifically, as shown in FIG. 4, the number of the standard pictures is greater than one, and the step S2 may include, but is not limited to, the following step S22.

At step S21, a plurality of compensation coordinates corresponding to a plurality of the standard pictures is generated according to the first compensation rule, a plurality of the standard optical data of the display panel corresponding to the plurality of the standard pictures, and a plurality of the first actual optical data of the first area corresponding to the plurality of the standard pictures. Each of the compensation coordinates includes a plurality of first compensation elements, and the plurality of compensation coordinates constitute the first compensation data.

As can be seen from the above discussion, given each standard picture, the first area 10 has theoretical optical data (i.e., the first standard optical data) and actual optical data (i.e., the first actual optical data), so that a plurality of first compensation data of the first area 10 corresponding to a plurality of the standard pictures may be generated.

Based on the fact that each pixel cell includes a red sub-pixel, a green sub-pixel and a blue sub-pixel, the number of the first compensation elements in the compensation coordinate may also be three. That is, the number of the first compensation elements in the compensation coordinate is equal to the number of sub-pixels in the pixel cell. Each of the first compensation elements may represent the degree of compensation for the sub-pixel of the corresponding color in the first area 10. Further, the plurality of compensation coordinates which corresponds to the plurality of standard pictures constitute the first compensation data.

Figure 5:
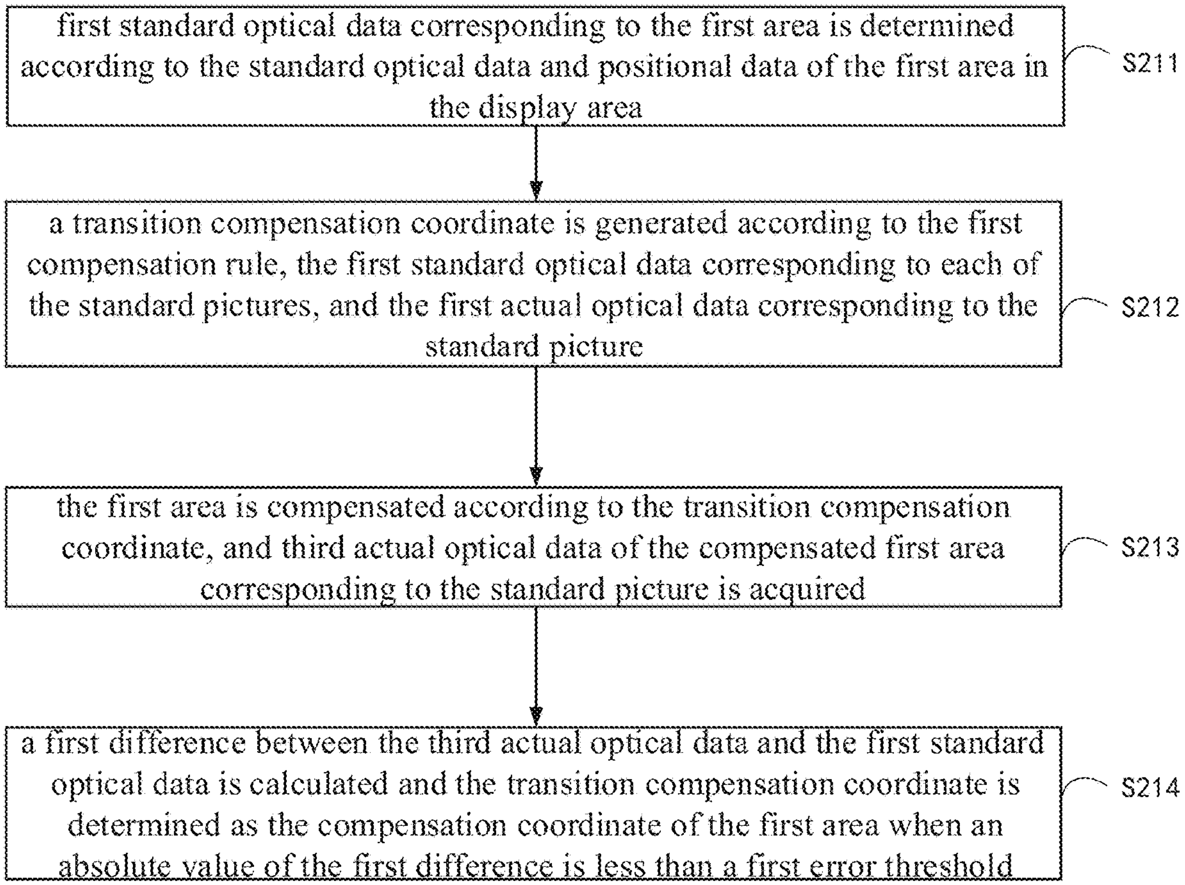

Further, as shown in FIG. 5, the step S21 may include, but is not limited to, the following steps S211 to S214 and combinations of the following steps S211 to S214.

At step S211, first standard optical data corresponding to the first area is determined according to the standard optical data and positional data of the first area in the display area.

The standard optical data may include positional data of each of a plurality of areas (for example, the nine areas in FIG. 2, in which the first area 10 may be at least one area of the nine areas) and a theoretical luminance value of the area given a standard picture, so that the corresponding first standard optical data of the first area 10 may be determined from the standard optical data according to the positional data of the first area 10 in the display area.

At step S212, a transition compensation coordinate is generated according to the first compensation rule, the first standard optical data corresponding to each of the standard pictures, and the first actual optical data corresponding to the standard picture.

As discussed above, each standard picture has a set of corresponding R, G, and B, and a current transition compensation coordinate may be generated based on current first actual optical data and the fixed first standard optical data corresponding to the first area 10. Similarly, the transition compensation coordinate ($\Delta R$, $\Delta G$, $\Delta B$) may also include three first transition compensation elements $\Delta R$, $\Delta G$, $\Delta B$ respectively corresponding to sub-pixels of three colors. Herein, the first compensation rule may depend on, but are not limited to, 3D Look-Up Table (3D LUT), and the above process of generating the transition compensation coordinate may be understood as follows.

Taking pre-acquired first standard optical data as a target, and starting from the first actual optical data presented by controlling the display area to emit light in accordance with initial display data (which is used for determining the set of corresponding R, G, and B), by observing the difference between the real-time color(s) of the first area 10 and the color(s) of the first area 10 in the standard picture with the human eye(s), and/or measuring the difference between the real-time color(s) of the first area 10 (i.e. the real-time luminance values of sub-pixels of three colors, which are included in the third actual optical data described below) and the theoretical color(s) of the first area 10 in the standard picture (i.e. the theoretical luminance values of sub-pixels of three colors, which are included in the first standard optical data described above) with optical instrument(s), the initial display data (the initial display data after each round of adjustment may correspond to the current three first transition compensation elements) is continuously adjusted until the two color(s) mentioned above are consistent, and the current transition compensation coordinate is recorded.

Similarly, each standard picture may be subjected to the above process so as to acquire the corresponding at least one transition compensation coordinate.

At step S213, the first area is compensated according to the transition compensation coordinate, and third actual optical data of the compensated first area corresponding to the standard picture is acquired.

At step S214, a first difference between the third actual optical data and the first standard optical data is calculated and the transition compensation coordinate is determined as the compensation coordinate of the first area when an absolute value of the first difference is less than a first error threshold.

Further, for the determination of the compensation coordinates, there may two understandings as follows.

(1) If the difference between the real-time color(s) (which corresponds to the third actual optical data) of the first area 10 corresponding to any of the standard pictures and the theoretical color(s) (which corresponds to the first actual optical data) of the first area 10 corresponding to the standard picture is large, that is, the transition compensation coordinate given the standard picture is considered to be not satisfactory in this case, then at this point it is necessary to continue to adjust the current transition compensation coordinate given the standard picture so as to acquire a next transition compensation coordinate, and so on so forth, until the difference between current third actual optical data and the first standard optical data of the first area 10 is small, that is, the absolute value of the difference between the two (i.e., a first difference) is smaller than the first error threshold. In terms of color difference, it can be understood that in the case that the color difference between a picture of the first area 10 corresponding to the first standard optical data and a picture of the first area 10 corresponding to the third actual optical data is smaller than the first error threshold (which may be equal to 2), the current transition compensation coordinate may be set as the compensation coordinate corresponding to the standard picture.

(2) If the difference between the average value of the real-time colors (which corresponds to the third actual optical data) of the first area 10 corresponding to all the standard pictures and the theoretical color (which corresponds to the first actual optical data) is large, that is, a current 3D LUT composed of a plurality of transition compensation coordinates generated on the basis of all the standard pictures is considered to be not satisfactory in this case, then at this point it is necessary to continue to adjust the transition compensation coordinate given each standard picture so as to acquire a next transition compensation coordinate, and so on so forth, until the difference (i.e., a first difference) between the current third actual optical data and the first standard optical data of the first area 10 is small, that is, the absolute value of the difference between the two is smaller than the first error threshold. In terms of color difference, it can be understood that given each standard picture, there is/are corresponding color difference(s) between a picture corresponding to the first standard optical data and a picture corresponding to the third actual optical data, and if the average value of a plurality of color differences corresponding to a plurality of standard pictures is smaller than the first error threshold (which may be equal to 2), then a plurality of current transition compensation coordinates may be set as the compensation coordinates corresponding to the plurality of standard pictures, respectively.

Herein, the color difference may be calculated with reference to the CIEDE2000 color difference formula where L (the total luminance value of a picture, L=0 denotes black, L=100 denotes white), a (the position of a picture between red and green, a<0 denotes bias toward green, a>0 denotes bias toward red), and b (the position of a picture between yellow and blue, b<0 denotes bias toward blue, b>0 denotes bias toward yellow) with respect to two pictures are involved. L, a, and b may be measured directly via an optical instrument. Alternatively, respective L, a, and b may be calculated from X, Y, Z of a respective picture measured by the optical instrument.

Combining the previous discussion on "a set of corresponding R, G, and B may be determined from the initial display data corresponding to each of the standard pictures" and "the transition compensation coordinate (ΔR, ΔG, ΔB) may also include three first transition compensation elements ΔR, ΔG, ΔB respectively corresponding to sub-pixels of three colors", it can be understood that if the difference between the real-time color(s) and the theoretical color(s) of the first area 10 corresponding to one of the standard pictures is small, that is, the transition compensation coordinate given the standard picture are considered to be satisfactory in this case, then the transition compensation coordinate at this point may be used as the compensation coordinate corresponding to the standard picture. That is, the three first compensation elements in the compensation coordinate (ΔR, ΔG, ΔB) are the current three first transition compensation elements ΔR, ΔG, ΔB, respectively.

Subsequent to Step S2, as shown in FIG. 1, the method further includes step S3.

At step S3, the display panel is compensated according to the first compensation data, and second actual optical data of the second area in the compensated display panel corresponding to the one or more standard pictures is acquired.

As discussed above, the first compensation data suitable for compensating the first area 10 may be acquired via step S2, and the first compensation data includes a plurality of compensation coordinates corresponding to a plurality of standard pictures, with each compensation coordinate in turn including a plurality of (e.g., three) first compensation elements corresponding to a plurality of (e.g., three) sub-pixels of different colors, i.e., the number of first compensation elements in the first compensation data is equal to (number of standard pictures)*(number of first compensation elements in the compensation coordinate).

For ease of description, it is herein defined that, given each standard picture, the first area 10 emits light so that the picture presenting the first standard optical data is a first standard sub-picture and the picture presenting the first actual optical data is a first actual sub-picture. Therefore, it can be considered that the first compensation data may compensate for difference(s) between the first actual sub-picture and the first standard sub-picture.

Further, step S3 adds the first compensation data to the initial display data, and drives the second area 20 to emit light with the display data at this point. The optical data of a second actual picture upon emission of the second area 20 is referred to as the second actual optical data. Similarly, based on the existence of a plurality of standard pictures, the second area 20 has the second actual optical data corresponding to each of the standard pictures, that is, the second area 20 has corresponding second actual optical data given each of the standard pictures. Similarly, the standard optical data of the first area 10 (referred to as the second standard optical data) may be determined from the standard optical data.

Subsequent to step S12, as shown in FIG. 3, the acquiring the second actual optical data of the display panel corresponding to the standard pictures after the display panel is compensated by the first compensation data of step S3 may include but is not limited to the following steps S31 and S32 and combinations of the following steps S31 and S32.

At step S31, corresponding transition display data is determined according to the initial display data and the first compensation data.

As discussed above, the first compensation data is suitable for compensating the first area 10. The transition display data can be understood to include current display data of the entire display area compensated by the first compensation data, and the current display data of the display area may be determined from the transition display data, thereby determining the grayscale value of the sub-pixel of each color.

At step S32, optical data of a displayed picture of the second area under control of the transition display data is acquired as the second actual optical data.

Similarly, a new set of corresponding R', G', and B' may be determined according to the transition display data corresponding to each standard picture. R', G', and B' may equal to R+ΔR, G+ΔG, and B+ΔB, respectively, thereby determining three data voltages corresponding to the standard picture. Further, a plurality of pixel cells in the display area may be driven to emit light by the three data voltages, and optical data of the second area 20 measured at this point may be taken as the second actual optical data. As discussed above, the second actual optical data may include a total luminance value of the second area 20, a new luminance value X' of all red sub-pixels in the second area 20, a luminance value Y' of all green sub-pixels in the second area 20, and a luminance value Z' of all blue sub-pixels in the second area 20. Here, the term "luminance value" indicates an actual luminance value of the object given the standard picture(s).

Subsequent to step S1, as shown in FIG. 1, the method further includes step S4.

At step S4, corresponding second compensation data is generated according to a second compensation rule, the standard optical data, and the second actual optical data, with a compensation accuracy of the second compensation rule being less than a compensation accuracy of the first compensation rule.

As discussed above, the second area 20 may be any one or more of the above-described nine areas. That is, standard optical data of the first area 10 (referred to as the second standard optical data) may be determined according to the standard optical data. Further, the second compensation data corresponding to the second area 20 may be generated according to the theoretical optical data (i.e., the second standard optical data) and the actual optical data (i.e., the second actual optical data) of the first area 10.

Subsequent to step S21, as shown in FIG. 4, step S4 may include but is not limited to the following steps S41 and S42 and combinations of the following steps S41 and S42.

At step S41, a portion of the standard pictures is selected as reference standard pictures.

Here, the number of the reference standard pictures may be smaller than the number of the standard pictures, and the selection criteria of the standard pictures are not limited herein. Further, the selected plurality of reference standard pictures may satisfy at least one of the following: a corresponding plurality of R's may be evenly arranged, a corresponding plurality of G's may be evenly arranged, and a corresponding plurality of B's may be evenly arranged.

At step S42, at least one corresponding compensation matrix is generated according to the second compensation rule, a plurality of the standard optical data of the display panel that respectively corresponds to a plurality of the reference standard pictures, and a plurality of the second actual optical data of the second area that respectively corresponds to the plurality of the reference standard pictures, wherein the at least one compensation matrix each include a plurality of second compensation elements, the at least one compensation matrix constitute the second compensation data, and a total number of the second compensation elements corresponding to the plurality of the standard pictures is smaller than a total number of the first compensation elements corresponding to the plurality of the standard pictures.

As can be seen from the above discussion, due to the positional difference between the second area 20 and the first area 10, the second area 20 has both theoretical optical data (i.e., the second standard optical data) and actual optical data (i.e., the second actual optical data) on the basis of compensation for the second area 20 by the first compensation data given each standard picture, and a plurality of second compensation data corresponding to the plurality of standard pictures may be generated from the both optical data.

Based on each pixel cell including a red sub-pixel, a green sub-pixel, and a blue sub-pixel, the number of the second compensation elements in the compensation matrix may be nine, that is, the number of the first compensation elements in the compensation coordinate is equal to the number of sub-pixels in the pixel cell. The compensation matrix in its entirety may characterize the degree of compensation for the pixel cells in the second area 20. The essence of the second compensation data is the compensation matrix.

Herein, the red sub-pixel may have a corresponding red stimulus value X, the green sub-pixel may have a corresponding green stimulus value Y, and the blue sub-pixel may have a corresponding blue stimulus value Z. Accordingly, the compensation matrix M herein may include nine second compensation elements m1 to m9 arranged in 3*3, and X, Y, Z, R', G', B' and the compensation matrix M may satisfy the following relationship.

$$[X\ \ Y\ \ Z]' = M^{*}[R'\ \ G'\ \ B']'$$

where the representation of the compensation matrix M may be as follows.

$$M = \begin{bmatrix} m_1 & m_2 & m_3 \\ m_4 & m_5 & m_6 \\ m_7 & m_8 & m_9 \end{bmatrix}.$$

It can be seen from the above discussion that, for each standard picture, the corresponding X, Y, Z, R', G', and B' may be acquired and substituted into the relationship expression [X Y Z]'=M*[R' G' B']', thereby deriving three equations.

Considering that the number of second compensation elements is nine, it is only necessary to obtain X, Y, Z, R', G', and B' corresponding to three standard pictures (i.e., the total number of standard images is greater than 3). By using the corresponding nine equations, m1 to m9 may be calculated to determine the compensation matrix M as the second compensation data.

Figure 6:
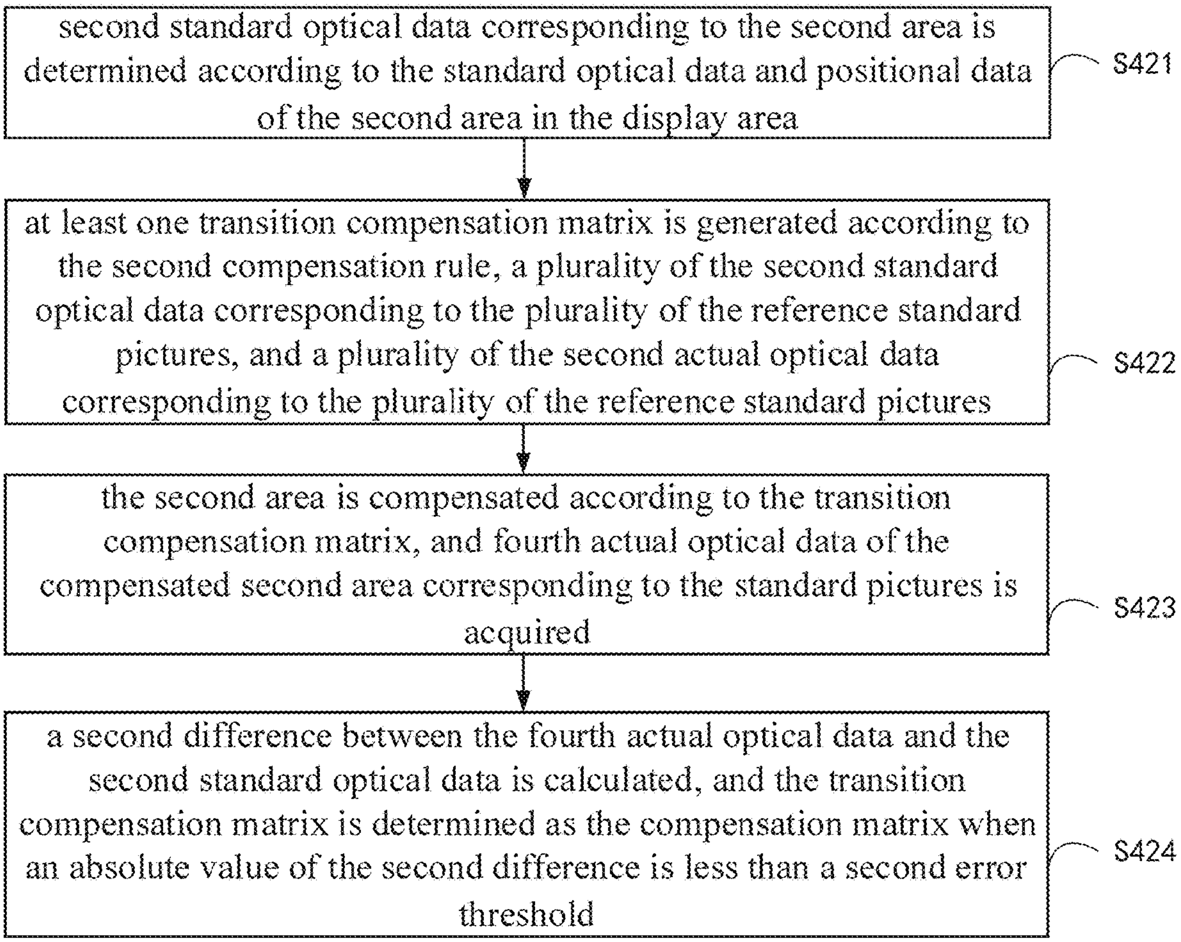

Further, as shown in FIG. 6, the step S42 may include, but is not limited to, the following steps S421 to S424 and combinations of the following steps S421 to S424.

At step S421, second standard optical data corresponding to the second area is determined according to the standard optical data and positional data of the second area in the display area.

Similarly, the standard optical data may include positional data of each of a plurality of areas (for example, the nine areas in FIG. 2, in which the second area 20 may be at least one area of the nine areas) and a theoretical luminance value of the area given a standard picture, so that the corresponding second standard optical data of the second area 20 may be determined from the standard optical data according to the positional data of the second area 20 in the display area.

At step S422, at least one transition compensation matrix is generated according to the second compensation rule, a plurality of the second standard optical data corresponding to the plurality of the reference standard pictures, and a plurality of the second actual optical data corresponding to the plurality of the reference standard pictures.

It can be seen from the above discussion that the transition display data (which is used for determining a new set of corresponding R', G', and B') may be acquired via step S31, and the second actual optical data may be acquired via step S32. The transition compensation matrix may also include nine second transition compensation elements corresponding to sub-pixels of three colors. The second compensation rules may depend on but are not limited to a 3*3 matrix. The above process of generating the transition compensation matrix may be understood as follows.

Taking the pre-acquired second standard optical data as a target, and starting from the second actual optical data presented by controlling the display area to emit light in accordance with the transition display data, by observing the difference between the real-time color(s) of the first area 10 and the theoretical color(s) of the first area 10 in the standard picture with the human eye(s) or optical instrument(s), the transition initial display data (the transition display data after each round of adjustment may correspond to the nine second transition compensation elements described above) is continuously adjusted until the two color(s) mentioned above are consistent, and current transition compensation matrix is recorded.

Similarly, each standard picture may be subjected to the above process so as to acquire the corresponding at least one transition compensation matrix.

At step S423, the second area is compensated according to the transition compensation matrix, and fourth actual optical data of the compensated second area corresponding to the standard pictures is acquired.

At step S424, a second difference between the fourth actual optical data and the second standard optical data is calculated, and the transition compensation matrix is determined as the compensation matrix when an absolute value of the second difference is less than a second error threshold.

Further, for the determination of the compensation matrix, reference may be made to the two understandings above in determining the compensation coordinates.

(1) If the difference between the real-time color(s) (which corresponds to the fourth actual optical data) and the theoretical color(s) (which corresponds to the second actual optical data) of the second area 20 corresponding to any standard picture is large, then the transition compensation matrix given the standard picture may be continuously adjusted to acquire a next transition compensation matrix. By analogy, in terms of color difference, in the case that the color difference between a picture of the second area 20 corresponding to the second standard optical data and a picture of the second area 20 corresponding to the fourth actual optical data is smaller than the second error threshold value (which may be equal to 2), the current transition compensation matrix may be set as the compensation matrix corresponding to the standard picture.

(2) If the difference between the average value of the real-time colors (which corresponds to the fourth actual optical data) of the second area 20 corresponding to all the standard pictures and the theoretical color (which corresponds to the second actual optical data) is large, that is, the compensation matrix generated on the basis of all the standard pictures is considered to be not satisfactory in this case, the transition compensation matrix given the standard pictures may be continuously adjusted to acquire a next transition compensation matrix, and so on so forth. In terms of color difference, if the average value of a plurality of color differences corresponding to a plurality of standard pictures is smaller than the second error threshold value (which may be equal to 2), then the current transition compensation matrix may be set as the compensation matrix corresponding to the plurality of standard pictures.

As discussed above, the second compensation data suitable for compensating the second area 20 may be acquired via step S4, and the first compensation data includes a compensation matrix corresponding to a plurality of standard pictures, with each compensation matrix including only nine second compensation elements corresponding to a plurality of (e.g., three) sub-pixels of different colors, that is, the number of second compensation elements in the second compensation data is equal to 9, which is far less than the number of first compensation elements in the first compensation data. Therefore, the accuracy of the second compensation rule is less than the accuracy of the first compensation rule.

It will be appreciated that the size of the first area 10 in the present disclosure is smaller than the size of the second area 20, and the accuracy of the first compensation rule for compensating for the first area 10 is set larger, and the accuracy of the first compensation rule for compensating for the second area 20 is set smaller. Due to the larger size of the second region 20 and the smaller measurable area of the optical instrument's probe, for example, the size of a first area 10 is equal to the size of the measurable area of the probe, and the second area 20 is divided into a plurality of unit areas (with the size of each unit area being equal to the size of the measurable area of the probe), therefore, the optical instrument may determine the first compensation data having a relatively large amount of data for the first area 10. Since the number of unit areas in the second area 20 is relatively large, the present disclosure determines second compensation sub-data having a relatively small amount of data for each unit area in the second area 20 based on the second compensation rule. The plurality of second compensation sub-data corresponding to the plurality of unit areas constitute the second compensation data, so that the amount of data of the second compensation data of the entire second area 20 may be prevented from being too large, the amount of data of the compensation data of the entire display area may be effectively reduced, the color difference(s) between the displayed picture(s) and the standard picture(s) may be compensated, and the uniformity of the overall luminance and/or chrominance of the displayed picture(s) may be improved.

In conjunction with the above discussion, a second area includes a plurality of unit areas, the second compensation data including a plurality of second compensation sub-data corresponding to the plurality of the unit areas, respectively, the second actual optical data including a plurality of second actual optical sub-data corresponding to the plurality of the unit areas, respectively, the second standard optical data including a plurality of second standard optical sub-data corresponding to the plurality of the unit areas, respectively, each of the second compensation sub-data being determined based on the second compensation rule and from the corresponding second standard optical sub-data and the corresponding second actual optical sub-data.

Specifically, the manner of generating the corresponding second compensation sub-data from the second actual optical sub-data of the second standard optical sub-data based on the second compensation rule may refer to the description of the above steps S4, S41 to S42, and S421 to S422. That is, the second compensation sub-data of each unit area in the second compensation data is generated in the above manner. The essence of each second compensation sub-data may be a corresponding compensation sub-matrix. The manner of generating the compensation sub-matrix may refer to the description of the above steps S41 to S42, and S421 to S422. Therefore, each unit area in the second area has a corresponding compensation sub-matrix.

In some embodiments, the first area 10 is a central area of the display area, and the second area 20 is disposed around the central area. For example, as shown in FIG. 2, the first area 10 may be an area E, the second area 20 may include areas A, B, C, D, F, G, H, I, and each of the areas A, B, C, D, F, G, H, I may be understood as a unit area as described above. As can be seen from the above discussion, at this point, the first compensation data may be considered to compensate for the luminance difference between a picture of the display area and a standard picture, and the second compensation data may be used to compensate for the luminance difference between the peripheral areas (areas A, B, C, D, F, G, H, I) and the central area (area E) of the display area.

In order to better illustrate steps S1 to S4 above, the present disclosure also provides a system for generating compensation data, which is applied to a display panel including a display area including a first area and a second area, the first area being smaller in size than the second area. The system for generating compensation data includes, as shown in FIG. 2, an optical instrument 300 for acquiring first actual optical data of the first area 10 corresponding to one or more standard pictures; a computer 200 for acquiring standard optical data of the display panel 100 corresponding to the one or more standard pictures; wherein the computer 200 is further for generating corresponding first compensation data according to a first compensation rule, the standard optical data, and the first actual optical data; wherein the computer 200 is further for compensating the display panel 100 according to the first compensation data; wherein the optical instrument 300 is further for acquiring second actual optical data of the second area 20 in the compensated display panel 100 corresponding to the one or more standard pictures; wherein the computer 200 is further for generating corresponding second compensation data according to a second compensation rule, the standard optical data, and the second actual optical data, wherein a compensation accuracy of the second compensation rule is less than a compensation accuracy of the first compensation rule; wherein the computer 200 is further for generating a compensation file applied to the display panel 100 according to the first compensation data and the second compensation data.

Figure 7:
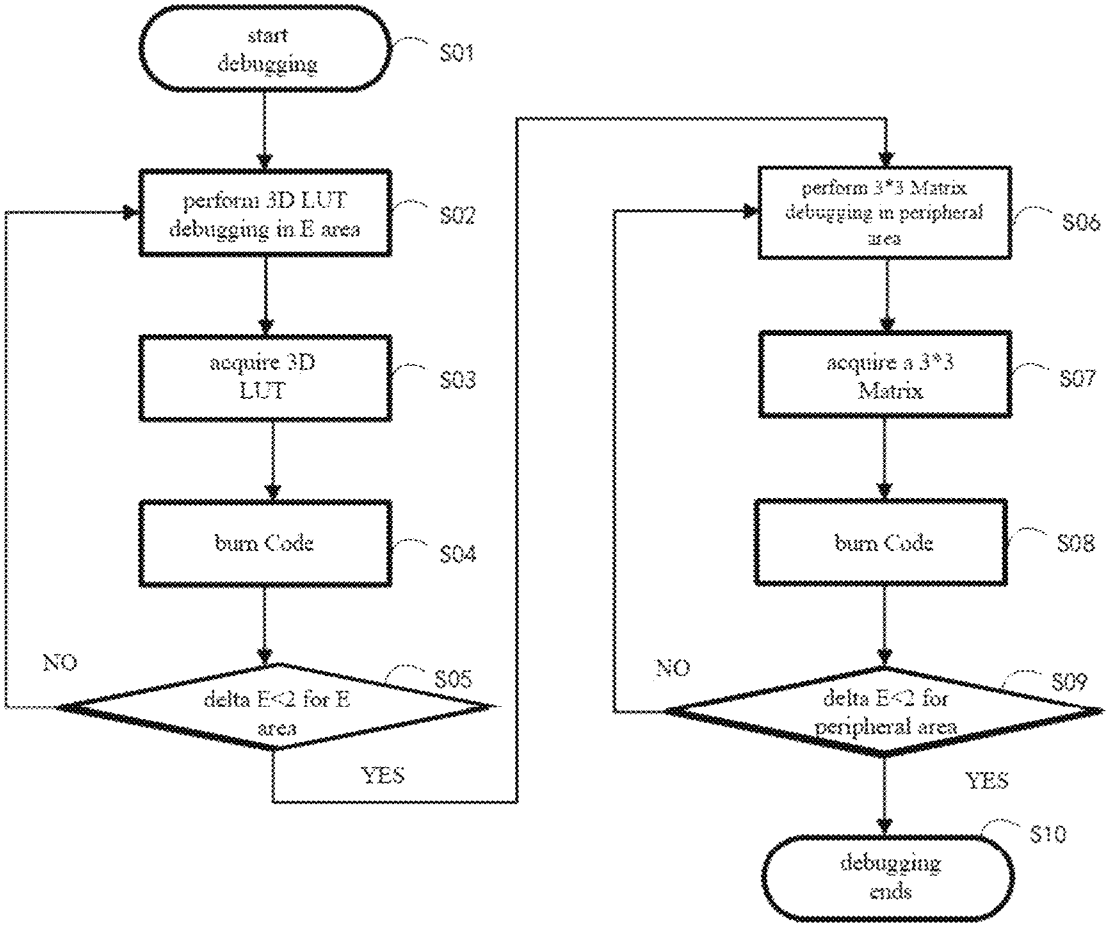

As shown in FIG. 7, a method for generating compensation data that may be executed by the system for generating compensation data may include, but is not limited to, the following steps.

Step S01, start debugging.

As shown in FIG. 2, it can be understood that an external computer 200 and an optical instrument 300 (which may be, but is not limited to, a colorimeter) are started to perform acquisition and debugging of the first actual optical data for the display panel 100.

Where, the above step S1 may be performed before S01, that is the standard optical data and the first actual optical data is acquired in advance.

Step S02, perform 3D LUT debugging in an E area.

Where, the E area may be understood as the first area, and the step S02 may be understood as the following in the above step S212: determining whether the color of the picture corresponding to the third actual optical data and the color of the picture corresponding to the first standard optical data are consistent based on human eye observation or optical instrument 300 measurement, if they are not consistent, continuing to adjust the transition compensation coordinate on computer 200, and if they are consistent, recording the current transition compensation coordinate.

Step S03, acquire 3D LUT.

Based on the first compensation rule, the current transition compensation coordinate given each standard picture is recorded when the colors of the two pictures in the above-mentioned step S02 are consistent, and a plurality of transition compensation coordinates constitute 3D LUT in this case.

Step S04, burn Code.

It is understood that the Code corresponding to the plurality of transition compensation coordinates in the 3D LUT generated in step S03 is burned to the display panel 100.

Step S05, determine whether the E area satisfies delta E<2.

Where, delta E may represent the color difference between the two pictures in the above-mentioned step S02, and may be understood in conjunction with the above-mentioned relevant definitions, and step S05 may be understood as the following in the above step S212: identifying the magnitude relationship between the absolute value of the difference between the current third actual optical data and the first standard optical data versus the first error threshold value (i.e., equal to 2), and determining based thereon whether the computer 200 is required to generate a next transition compensation coordinate.

If the result of the determination in step S05 is NO, return to execute step S02.

If the result of the determination in step S05 is YES, perform the following.

Step S06, perform 3*3 Matrix debugging in peripheral area.

The peripheral area may be understood as the second area, and the step S06 may be understood as the following in the above step S422: determining whether the color of the picture corresponding to the fourth actual optical data and the color of the picture corresponding to the second standard optical data are consistent based on human eye observation or optical instrument 300 measurement, if they are not consistent, continuing to adjust the transition compensation matrix on computer 200, and if they are consistent, recording the current transition compensation matrix.

Step S07, acquire a 3*3 Matrix.

Based on the second compensation rule, the current transition compensation matrix given a plurality of standard pictures recorded when the colors of the two pictures are consistent in step S06 above is the 3*3 Matrix in this case.

Step S08, burn Code.

It is understood that the Code corresponding to the 3*3 Matrix (transition compensation matrix) generated in step S07 is burned to the display panel 100.

Step S09, determine whether the peripheral area satisfies delta E<2.

Where, delta E may represent the color difference between the two pictures in the above-mentioned step S06, and may be understood in conjunction with the above-mentioned relevant definitions, and step S09 may be understood as the following in the above step S412: identifying the magnitude relationship between the absolute value of the difference between the current fourth actual optical data and the second standard optical data versus the second error threshold value (i.e., equal to 2), and determining based thereon whether the computer 200 is required to generate a next transition compensation matrix.

If the result of the determination in step S09 is NO, return to execute step S06.

If the result of the determination in step S09 is YES, perform the following.

Step S10, debugging ends.

At this point, the final first compensation data (multiple compensation coordinates) and second compensation data (compensation matrix) have been determined.

Corresponding to the above-described method for generating compensation data, the present disclosure also provides a compensation method for a display panel applied to the display panel, which may include, but is not limited to, the following embodiments and combinations of the following embodiments.

Figure 8:
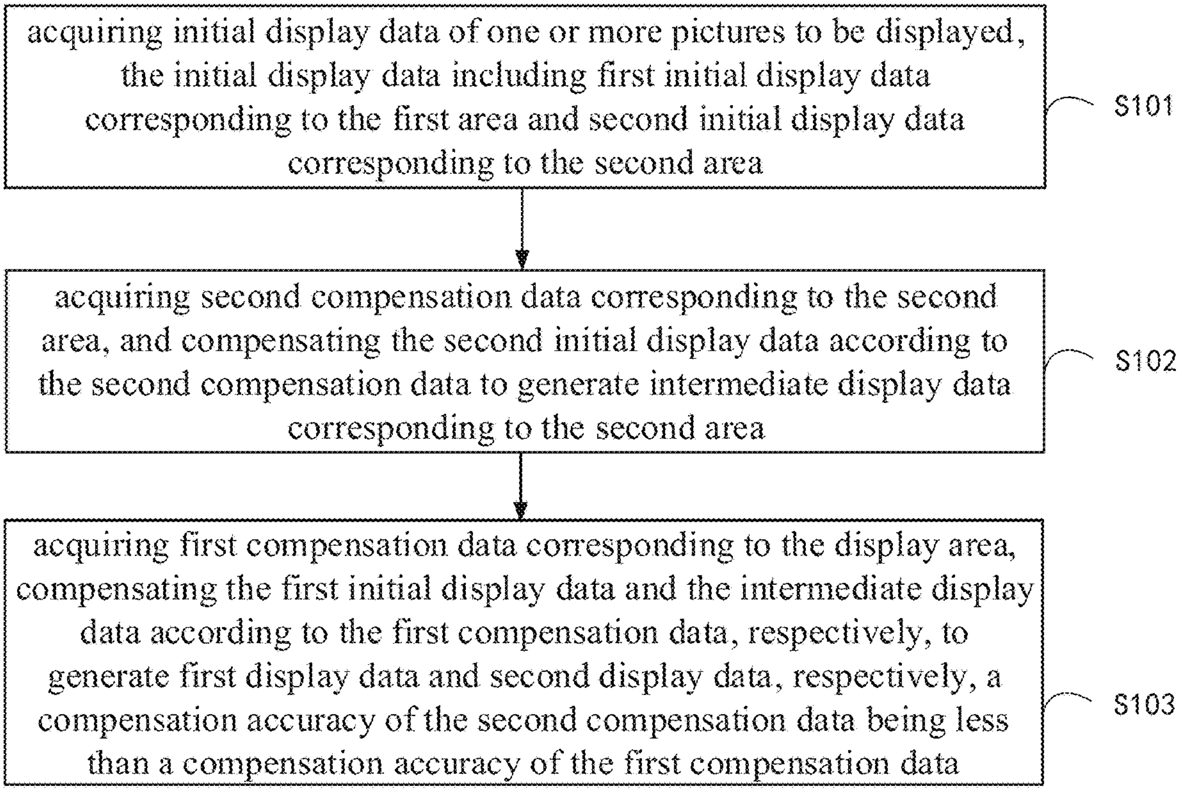
FIGS. 8-9 are two respective flow charts of a compensation method for a display panel according to embodiments of the present disclosure.

In some embodiments, as shown in FIG. 8, the compensation method for the display panel may include, but is not limited to, the following steps and combinations of the following steps.

Step S101, acquiring initial display data of one or more pictures to be displayed, the initial display data including first initial display data corresponding to the first area and second initial display data corresponding to the second area.

The first initial display data and the second initial display data in the initial display data may be understood as the display data without undergoing the above-described compensation data processing. If the initial display data is directly applied to pixels, color distortion may be considered as a problem.

Step S102, acquiring second compensation data corresponding to the second area, and compensating the second initial display data according to the second compensation data to generate intermediate display data corresponding to the second area.

As can be seen from the above discussion, the second compensation data may be used to compensate the luminance difference between the second area 20 (peripheral area) and the first area (central area) of the display area, so that the intermediate display data here acts on the second area, and the first initial display data acts on the first area, so that the uniformity of the luminance and/or chrominance of the displayed picture(s) of the display area may be improved.

Note that the second compensation data generated above may be considered to correspond to only portions of grayscale values (referred to as a binding point grayscale value(s)). If the grayscale value(s) corresponding to the second initial display data is/are different from the binding point grayscale value(s), the corresponding grayscale value(s) may be determined by defining a difference value(s), thereby generating the intermediate display data.

Step S103, acquiring first compensation data corresponding to the display area, compensating the first initial display data and the intermediate display data according to the first compensation data, respectively, to generate first display data and second display data, respectively, a compensation accuracy of the second compensation data being less than a compensation accuracy of the first compensation data.

As can be seen from the above discussion, the first compensation data can be considered as compensating for the luminance and/or chrominance difference between the picture(s) of the display area and the standard picture(s), so that the first display data and the second display data acquired after the application of the first compensation data may already compensate for the luminance and/or chrominance difference between the picture(s) of the entire display area and the standard picture(s), and the luminance uniformity of the entire display area.

Where, "a compensation accuracy of the second compensation data corresponding to each pixel is less than a compensation accuracy of the first compensation data corresponding to each pixel" may be understood with reference to the above-mentioned "a compensation accuracy of the second compensation data being less than a compensation accuracy of the first compensation data".

Similarly, the first compensation data generated above may be considered to correspond to only portions of grayscale values (referred to as a binding point grayscale value(s)). If the grayscale value(s) corresponding to the first initial display data and the intermediate display data is/are different from the binding point grayscale value(s), the corresponding grayscale value(s) may be determined by defining a difference value(s), thereby generating the first display data and the second display data.

Figure 9:
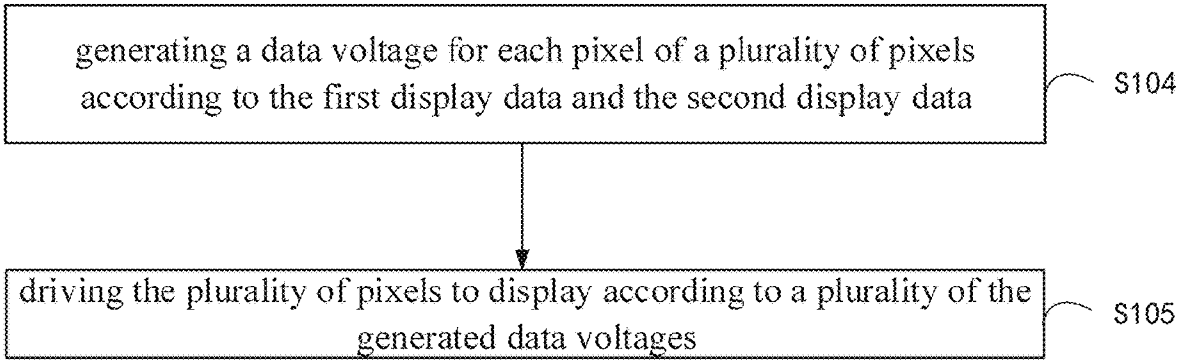

In some embodiments, as shown in FIG. 9, subsequent to step S103, the method may include, but not limited to, the following steps and combinations of the following steps.

Step S104, generating a data voltage for each pixel of a plurality of pixels according to the first display data and the second display data.

As can be appreciated in connection with the above discussion, a pixel may be understood as a pixel cell or a sub-pixel, the pixel cell may include a plurality of sub-pixels of different colors, the sub-pixel of each color may have a corresponding data voltage at each grayscale value. The first display data herein may include a grayscale value(s) of each sub-pixel in the first area, and the second display data may include a grayscale value(s) of each sub-pixel in the second area. The data voltage of each sub-pixel may be generated based on a mapping relationship between the grayscale value(s) and the data voltage of the sub-pixels of each color stored in the display panel.

Step S105, driving the plurality of pixels to display according to a plurality of the generated data voltages.

Specifically, each data voltage is transmitted to a corresponding sub-pixel, and the sub-pixel can be driven to emit a corresponding luminance by the corresponding pixel circuit, so that the display area presents a complete displayed picture.

Figure 10:
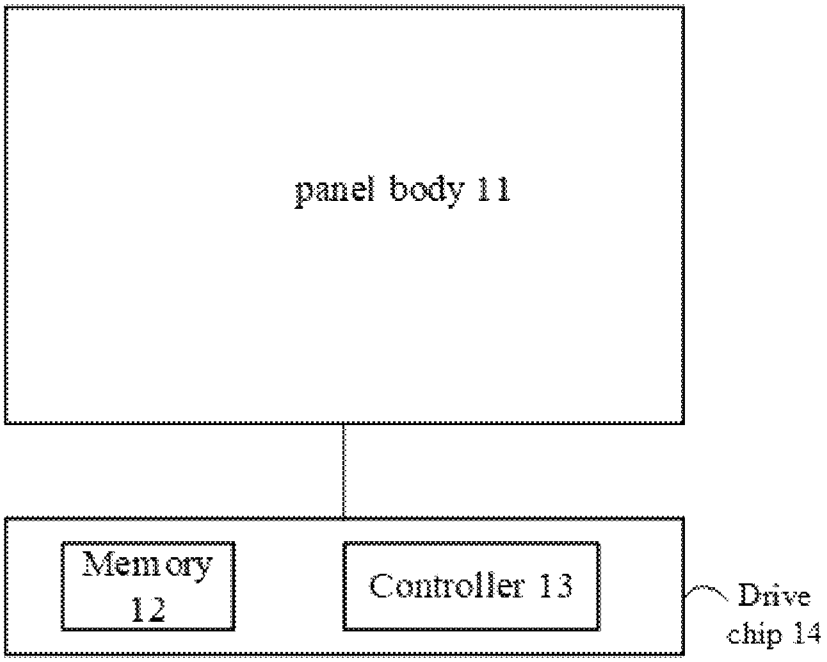
FIG. 10 is a diagram of an architecture of a display panel according to embodiments of the present disclosure.

In order to better realize the compensation method for the display panel, the present disclosure further provides a display panel, as shown in FIG. 10, including a panel body 11; a memory 12 for storing the first compensation data, the second compensation data, and the luminance compensation method for the display panel as described above; a controller 13 for invoking the first compensation data, the second compensation data, and the luminance compensation method for the display panel. The memory 12 and the controller 13 may be integrated in a drive chip 14, which is electrically connected to a plurality of pixels in the panel body 11.

The present disclosure provides a method for generating compensation data, a system for generating compensation data, a display panel, and a compensation method for the display panel. The method is based on a first area having a small size and a second area having a large size. First compensation data for compensating the first area is generated according to a first compensation rule having a large accuracy. After the second area is subjected to the application of the first compensation data, second compensation data for compensating the second area is generated according to a second compensation rule having a small accuracy. The method effectively reduces the amount of data of compensation data of the entire display area, compensates for a color difference between a displayed picture(s) and a standard picture (a), and improves uniformity of the overall luminance and/or chrominance of the displayed picture(s).

Those of ordinary skill in the art can understand that all or part of the processes in the methods of the above embodiments can be completed by instructing relevant hardware through a computer program. The computer program can be stored in a non-volatile computer-readable storage medium. The computer program when executed may include the processes of the embodiments of the above methods. Any reference to memory, storage, database or other media used in the various embodiments provided by the present disclosure may include non-volatile and/or volatile memory. Non-volatile memory may include read-only memory (ROM), programmable ROM (PROM), electrically programmable ROM (EPROM), electrically erasable programmable ROM (EEPROM), or flash memory. Volatile memory may include random access memory (RAM) or external cache memory. By way of illustration and not limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchronous link (Synchlink) DRAM (SLDRAM), memory bus (Rambus) direct RAM (RDRAM), direct memory bus dynamic RAM (DRDRAM), and memory bus dynamic RAM (RDRAM), etc.

Unless otherwise stated, it should be understood that terms such as "processing", "computing", "calculating", "identifying" and the like refer to actions and/or processes of a computer or computing system, or similar electronic computing device. The computing system or similar electronic computing device manipulates and/or converts data represented as physical (e.g., electronic) quantities within the computing system's registers and/or memory, converts such data into other data similarly represented as physical quantities within a computing system memory or register or other such information memory, transmission or mobile terminal. In this context, the embodiments are not limited. The term "coupled" may be used herein to refer to any type of relationship, direct or indirect, between the components under discussion, and may apply to electrical, mechanical, fluid, optical, electromagnetic, electromechanical, or other connections. In addition, the terms "first", "second", etc. are used herein only to facilitate discussion, and have no specific temporal or chronological meaning unless otherwise stated.

In addition, it is obvious that the word "comprising/including" does not exclude other elements or steps, and the singular forms do not exclude the plural forms. The expression "and/or" used herein includes all or any units and all combinations of one or more associated listed items.

Finally, it should be noted that: for those skilled in the art, it is obvious that the present application is not limited to the details of the above-mentioned exemplary embodiments, and that the present application can be implemented in other specific forms without departing from the spirit or basic features of the present application. Therefore, the embodiments should be regarded as exemplary and non-restrictive from any point of view, and the scope of the present application is defined by the appended claims rather than by the above description, and it is therefore intended that all changes that fall within the meaning and scope of equivalent elements of the claims are included in the present application.

The above provides a detailed description of the method and system for generating compensation data, the display panel, and the compensation method thereof provided by the embodiments of the present invention. Specific examples are applied herein to explain the principles and implementations of the present disclosure. The above embodiments are only used to help understand the technical solutions and core ideas of the present disclosure. A person of ordinary skill in the art should understand that it is still possible to modify the technical solutions documented in the preceding embodiments or to make equivalent substitutions for some of the technical features therein; and these modifications or substitutions do not take the essence of the corresponding technical solutions out of the scope of the technical solutions of the various embodiments of the present disclosure.

What is claimed is:

1. A method for generating compensation data, which is applied to a display panel, the display panel comprising a display area, the display area comprising a first area and a second area, a size of the first area being smaller than a size of the second area, the method for generating the compensation data comprising:

acquiring pieces of standard optical data of the display panel corresponding to standard pictures, and pieces of first actual optical data of the first area corresponding to the standard pictures;

generating corresponding pieces of first compensation data according to a first compensation rule, the pieces of standard optical data, and the pieces of first actual optical data;

compensating the display panel according to the pieces of first compensation data, and acquiring pieces of second actual optical data of the second area in the compensated display panel corresponding to the standard pictures; and generating corresponding second pieces of compensation data according to a second compensation rule, the pieces of standard optical data, and the pieces of second actual optical data, a compensation accuracy of the second compensation rule being less than a compensation accuracy of the first compensation rule;

wherein a number of the standard pictures is greater than one, and the generation of the corresponding pieces of first compensation data according to the first compensation rule, the pieces of standard optical data, and the pieces of first actual optical data comprises:

generating a plurality of compensation coordinates corresponding to a plurality of the standard pictures according to the first compensation rule, a plurality of the pieces of standard optical data of the display panel corresponding to the plurality of the standard pictures, and a plurality of the pieces of first actual optical data of the first area corresponding to the plurality of the standard pictures, each of the compensation coordinates comprising a plurality of first compensation elements, the plurality of compensation coordinates constituting the pieces of first compensation data;

wherein the generation of corresponding pieces of second compensation data according to the second compensation rule, the pieces of standard optical data, and the pieces of second actual optical data comprises:

selecting a portion of the standard pictures as reference standard pictures;

generating at least one corresponding compensation matrix according to the second compensation rule, a plurality of the pieces of standard optical data of the display panel that respectively corresponds to a plurality of the reference standard pictures, and a plurality of the pieces of second actual optical data of the second area that respectively corresponds to the plurality of the reference standard pictures, wherein the at least one compensation matrix each comprise a plurality of second compensation elements, the at least one compensation matrix constitute the pieces of second compensation data, and a total number of the second compensation elements corresponding to the plurality of the standard pictures is smaller than a total number of the first compensation elements corresponding to the plurality of the standard pictures.

2. The method for generating the compensation data of claim 1, wherein the generation of the plurality of compensation coordinates corresponding to the plurality of the standard pictures according to the first compensation rule, the plurality of the pieces of standard optical data of the display panel corresponding to the plurality of the standard pictures, and the plurality of the pieces of first actual optical data of the first area corresponding to the plurality of the standard pictures comprises:

determining pieces of first standard optical data corresponding to the first area according to the pieces of standard optical data and positional data of the first area in the display area;

generating a transition compensation coordinate according to the first compensation rule, the pieces of first standard optical data each corresponding to a respective one of the standard pictures, and the pieces of first actual optical data corresponding to the standard pictures;

compensating the first area according to the transition compensation coordinate, and acquiring pieces of third actual optical data of the compensated first area corresponding to the standard pictures;

calculating a first difference between the pieces of third actual optical data and the pieces of first standard optical data, and determining the transition compensation coordinate as the compensation coordinate of the first area when an absolute value of the first difference is less than a first error threshold.

3. The method for generating the compensation data of claim 1, wherein the generation of the at least one corresponding compensation matrix according to the second compensation rule, the plurality of the pieces of standard optical data of the display panel that respectively corresponds to the plurality of the reference standard pictures, and the plurality of the pieces of second actual optical data of the second area that respectively corresponds to the plurality of the reference standard pictures comprises:

determining pieces of second standard optical data corresponding to the second area according to the pieces of standard optical data and positional data of the second area in the display area;

generating at least one transition compensation matrix according to the second compensation rule, a plurality of the pieces of second standard optical data corresponding to the plurality of the reference standard pictures, and the plurality of the pieces of second actual optical data corresponding to the plurality of the reference standard pictures;

compensating the second area according to the transition compensation matrix, and acquiring pieces of fourth actual optical data of the compensated second area corresponding to the standard pictures;

calculating a second difference between the pieces of fourth actual optical data and the pieces of second standard optical data, and determining the transition compensation matrix as the compensation matrix when an absolute value of the second difference is less than a second error threshold.

4. The method for generating the compensation data of claim 3, wherein the second area comprises a plurality of unit areas, the pieces of second compensation data comprising pieces of second compensation sub-data respectively corresponding to the plurality of unit areas, the pieces of second actual optical data comprising pieces of second actual optical sub-data respectively corresponding to the plurality of unit areas, the pieces of second standard optical data comprising pieces of second standard optical sub-data respectively corresponding to the plurality of unit areas; for each of the unit areas, a respective one of the pieces of second compensation sub-data being determined according to the second compensation rule, a respective one of the pieces of second standard optical sub-data corresponding to the unit area, and a respective one of the pieces of second actual optical sub-data corresponding to the unit area.

5. The method for generating the compensation data of claim 1, wherein the acquisition of the pieces of first actual optical data of the first area corresponding to the standard pictures comprises:

acquiring pieces of initial display data corresponding to the standard pictures;

acquiring pieces of optical data of a displayed picture of the first area under control of the pieces of initial display data as the pieces of first actual optical data;

wherein the acquisition of the pieces of second actual optical data of the second area in the compensated display panel corresponding to the standard pictures comprises:

determining corresponding pieces of transition display data according to the pieces of initial display data and the pieces of first compensation data;

acquiring pieces of optical data of a displayed picture of the second area under control of the pieces of transition display data as the pieces of second actual optical data.

6. The method for generating the compensation data of claim 1, wherein the first area is a central area of the display area and the second area is disposed around the central area.

7. The method for generating the compensation data of claim 6, wherein the generation of the plurality of compensation coordinates corresponding to the plurality of the standard pictures according to the first compensation rule, the plurality of the pieces of standard optical data of the display panel corresponding to the plurality of the standard pictures, and the plurality of the pieces of first actual optical data of the first area corresponding to the plurality of the standard pictures comprises:

determining pieces of first standard optical data corresponding to the first area according to the pieces of standard optical data and positional data of the first area in the display area;

generating a transition compensation coordinate according to the first compensation rule, the pieces of first standard optical data each corresponding to a respective one of the standard pictures, and the pieces of first actual optical data corresponding to the standard pictures;

compensating the first area according to the transition compensation coordinate, and acquiring pieces of third actual optical data of the compensated first area corresponding to the standard pictures;

calculating a first difference between the pieces of third actual optical data and the pieces of first standard optical data, and determining the transition compensation coordinate as the compensation coordinate of the first area when an absolute value of the first difference is less than a first error threshold.

8. The method for generating the compensation data of claim 6, wherein the generation of the at least one corresponding compensation matrix according to the second compensation rule, the plurality of the pieces of standard optical data of the display panel that respectively corresponds to the plurality of the reference standard pictures, and the plurality of the pieces of second actual optical data of the second area that respectively corresponds to the plurality of the reference standard pictures comprises:

determining pieces of second standard optical data corresponding to the second area according to the pieces of standard optical data and positional data of the second area in the display area;

generating at least one transition compensation matrix according to the second compensation rule, a plurality of the pieces of second standard optical data corresponding to the plurality of the reference standard pictures, and the plurality of the pieces of second actual optical data corresponding to the plurality of the reference standard pictures;

compensating the second area according to the transition compensation matrix, and acquiring pieces of fourth actual optical data of the compensated second area corresponding to the standard pictures;

calculating a second difference between the pieces of fourth actual optical data and the pieces of second standard optical data, and determining the transition compensation matrix as the compensation matrix when an absolute value of the second difference is less than a second error threshold.

9. The method for generating the compensation data of claim 8, wherein the second area comprises a plurality of unit areas, the pieces of second compensation data comprising pieces of second compensation sub-data respectively corresponding to the plurality of unit areas, the pieces of second actual optical data comprising pieces of second actual optical sub-data respectively corresponding to the plurality of unit areas, the pieces of second standard optical data comprising pieces of second standard optical sub-data respectively corresponding to the plurality of unit areas; for each of the unit areas, a respective one of the pieces of second compensation sub-data being determined according to the second compensation rule, a respective one of the pieces of second standard optical sub-data corresponding to the unit area, and a respective one of the pieces of second actual optical sub-data corresponding to the unit area.

10. The method for generating the compensation data of claim 6, wherein the acquisition of the pieces of first actual optical data of the first area the display panel corresponding to the standard pictures comprises:

acquiring pieces of initial display data corresponding to the standard pictures;

acquiring pieces of optical data of a displayed picture of the first area under control of the pieces of initial display data as the pieces of first actual optical data;

wherein the acquisition of the pieces of second actual optical data of the second area in the compensated display panel corresponding to the standard pictures comprises:

determining corresponding pieces of transition display data according to the pieces of initial display data and the pieces of first compensation data;

acquiring pieces of optical data of a displayed picture of the second area under control of the pieces of transition display data as the pieces of second actual optical data.

11. A system for generating compensation data, which is applied to a display panel, the display panel comprising a display area, the display area comprising a first area and a second area, a size of the first area being smaller than a size of the second area, the system for generating compensation data comprising:

an optical instrument configured to acquire pieces of first actual optical data of the first area corresponding to standard pictures;

a computer configured to acquire pieces of standard optical data of the display panel corresponding to the standard pictures;

wherein the computer is further configured to generate corresponding pieces of first compensation data according to a first compensation rule, the pieces of standard optical data, and the pieces of first actual optical data;

wherein the computer is further configured to compensate the display panel according to the pieces of first compensation data;

wherein the optical instrument is further configured to acquire pieces of second actual optical data of the second area in the compensated display panel corresponding to the standard pictures;

wherein the computer is further configured to generate corresponding pieces of second compensation data according to a second compensation rule, the pieces of standard optical data, and the pieces of second actual optical data, wherein a compensation accuracy of the second compensation rule is less than a compensation accuracy of the first compensation rule;

wherein the computer is further configured to generate a compensation file applied to the display panel according to the pieces of first compensation data and the pieces of second compensation data.

* * * * *